H. J. Phalen,
Steam-Boiler Water-Heater.
Nº 69,477.  Patented Oct. 1, 1867.

United States Patent Office.

HENRY J. PHALEN, OF PLANTERSVILLE, TEXAS.

Letters Patent No. 69,477, dated October 1, 1867.

---

IMPROVED APPARATUS FOR HEATING WATER AND CONDENSING STEAM.

*The Schedule referred to in these Letters Patent and making part of the same.*

---

TO ALL WHOM IT MAY CONCERN:

Be it known that I, HENRY J. PHALEN, of Plantersville, in the county of Grimes, and State of Texas, have invented a certain new and useful improvement on Apparatus for Heating Water and other Liquids, and Condensing Steam, of which the following is a full, clear, and exact description, reference being had to the accompanying drawing, forming part of this specification, and in which—

Figure 1:
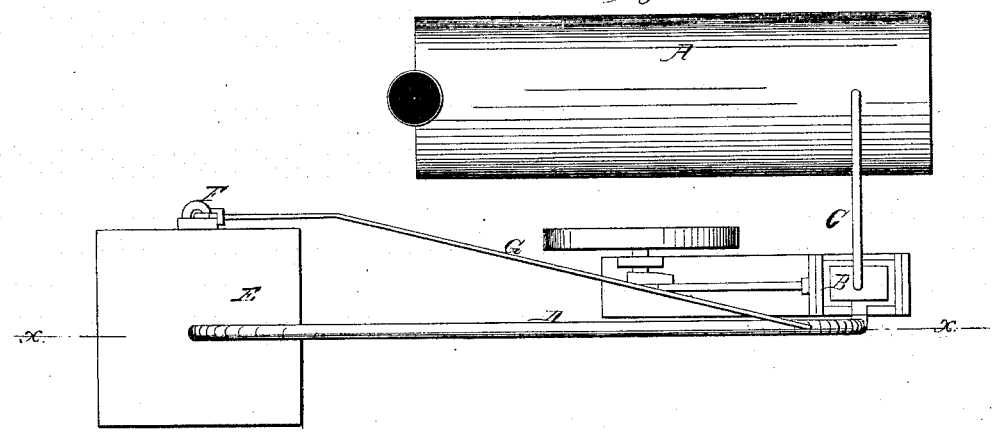

Figure 1 represents a plan of an apparatus embracing my improvement, and

Figure 2:
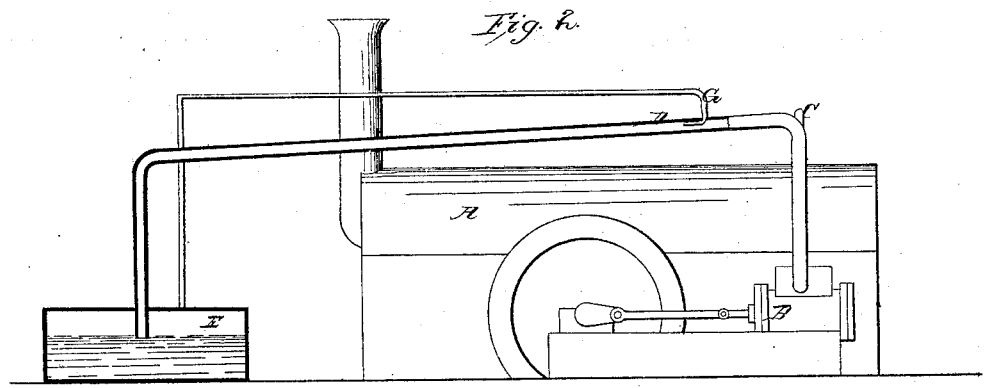

Figure 2 a vertical section through the line $x\ x$ in fig. 1.

Like letters indicate like parts throughout both figures.

The nature of my invention consists in a novel arrangement of pipes for the passage of steam, which may be the exhaust steam of an engine, and of water or other liquor, which may be the feed-water to the engine, or for supplying a vat for the infusion of tan-bark or other purpose, in such manner as that the water or liquor is forced in the same direction as the current of steam, by which it is overtaken, and with which it mingles in a spray-like or divided condition, causing both condensation of steam and heating of the water or liquor brought in direct contact with it.

Referring to the accompanying drawing, A represents the steam-boiler of an engine, B; C, the supply-steam pipe thereto, and D the exhaust, which is arranged to discharge into a vat or chamber, E, and which may contain an infusion of bark or liquor for tanning purposes, or may be a feed-water vessel to the boiler, or be used for any other purpose. F is a feed-pump, that may be operated by the engine or otherwise, and which has connected with it a pipe, G, into which it forces the water or liquor. This pipe G is made to communicate with the exhaust-steam pipe D in such manner as that it discharges into it in a course corresponding to the direction in which the current of steam passes, the water or liquor being divided, or distributed, as it were, among the steam which overtakes it by reason of the comparative areas of the pipes D and G, and which divided or spray-like action may be increased by giving to the discharge end of the pipe G a spread and slitted or perforated character. The exhaust steam from the engine thus coming in direct contact with the water or liquor discharged by the pipe G, not only imparts the whole or greater part of its heat to it in its passage to the vat or chamber E, but is condensed by its contact with such water or liquor, thereby creating a partial vacuum, or tendency thereto, to the relief of back pressure on the engine.

What I claim as my invention, and desire to secure by Letters Patent, is—

The arrangement of the pipes D G for the passage of the steam and of the water or other liquor, whereby the water or liquor is forced in the same direction as the current of steam, by which it is overtaken, and with which it mingles in a spray-like or other divided condition, substantially as and for the purpose herein specified.

HENRY J. PHALEN.

Witnesses:
A. LE CLERC,
HENRY T. BROWN.